(12) United States Patent
Warmerdam

(10) Patent No.: US 7,073,535 B1
(45) Date of Patent: Jul. 11, 2006

(54) INFLATABLE PIPE PLUG

(76) Inventor: Gerard Warmerdam, 940 E. Pine St., Lodi, CA (US) 95240

( * ) Notice: Subject to any disclaimer, the term of this patent is extended or adjusted under 35 U.S.C. 154(b) by 0 days.

(21) Appl. No.: 10/770,722

(22) Filed: Feb. 3, 2004

(51) Int. Cl.
*F16L 55/12* (2006.01)

(52) U.S. Cl. .......................... 138/93; 138/89
(58) Field of Classification Search .............. 138/93, 138/89, 121
See application file for complete search history.

(56) References Cited

U.S. PATENT DOCUMENTS

| | | | |
|---|---|---|---|
| 2,681,706 A * | 6/1954 | Pottorf | 277/333 |
| 3,762,446 A | 10/1973 | Tungseth et al. | |
| 3,834,422 A | 9/1974 | Larson | |
| 3,958,607 A * | 5/1976 | Gray | 138/97 |
| 4,421,698 A | 12/1983 | Vanderlans | |
| 4,423,754 A | 1/1984 | Carter, Jr. | |
| 4,449,584 A * | 5/1984 | Christensen | 166/187 |
| 4,460,019 A * | 7/1984 | Condon | 138/90 |
| 4,602,659 A | 7/1986 | Parkyn, Sr. | |
| 4,614,206 A | 9/1986 | Mathison et al. | |
| 4,660,603 A * | 4/1987 | Tash | 138/92 |
| 4,660,644 A * | 4/1987 | Egnor | 166/285 |
| 4,790,356 A | 12/1988 | Tash | |
| 4,964,439 A * | 10/1990 | Vanderlans | 138/93 |
| 5,358,012 A * | 10/1994 | Kish | 138/109 |
| 5,901,752 A | 5/1999 | Lundman | |
| 6,361,015 B1 | 3/2002 | Warmerdam | |
| 6,481,465 B1 | 11/2002 | Warmerdam | |

OTHER PUBLICATIONS (Product Brochure) Plug-It Products 2001 Product Catalog (2001) pp. 1,2,9-12.

* cited by examiner

Primary Examiner—James Hook
(74) Attorney, Agent, or Firm—Richard Esty Peterson, Patent Attorney

(57) ABSTRACT

An inflatable pipe plug having an improved mold-formed gripping surface and a method of fabricating the pipe plug. The pipe plug has a cylindrical elastic body with ends that are connected to rigid end caps by a swaging ring, the outer surface of the expandable elastic body having a series of raised ribs and textured bands formed by expanding an uncured cylindrical rubber sleeve in a mold and curing the sleeve to form the plug body.

6 Claims, 2 Drawing Sheets

INFLATABLE PIPE PLUG

BACKGROUND OF THE INVENTION

This invention relates to a pneumatic pipe plug typically used to block or divert the flow in municipal or commercial pipe. In particular, this invention relates to a pipe plug having a molded surface designed to resist slippage when installed and the method of manufacturing the plug.

A pneumatic pipe plug operates by inflating an expandable bladder which expands against the inside wall of the pipe. Typically, the pipe can range from inches to many feet in diameter. The pneumatic pipe plug remains in place by the frictional forces generated between the expanded bladder and the inside wall of the pipe. As used herein, the term "pipe plug" includes a flow diverter in which the normal flow of the fluid in the pipe is blocked and directed to a smaller flow through conduit and typically redirected to a recovery or disposal location through a connected hose.

The pipe plug is typically used in an environment that is unpredictable and may be critical to the safety of workers, for example, in a municipal sewer pipe line that is blocked with a pipe plug to allow repair men to enter and repair a segment of pipe. In such environments, the pipe plug must be versatile, rugged and highly resistant to failure. In order to meet this challenge, conventional pneumatic pipe plugs are in part hand fabricated which adds substantially to the resultant cost. Problems in fabricating pipe plugs for larger diameter pipe are compounded by the aggregate forces applied to the plug from even moderate fluid pressures. In typical drainage pipe systems, the pipe plug must withstand a ten foot water head and similar pressures from fluids and other environments are expected to be encountered.

In order to achieve greater uniformity in the manufacture of pipe plugs, particularly in larger diameters, mechanized fabrication and assembly has largely replaced hand fabrication and assembly. In addition to a uniform appearance, the mechanically manufactured pipe plug has a more consistent structural integrity and predictable reliability. Since an inflated pipe plug or flow diverter may be all that separates a worker from a flow of water, an unexpected failure should be avoided. Mechanizing and automating the manufacturing tasks reduce the unit cost and standardize performance.

In fabricating a pneumatic pipe plug the interconnection of the pneumatic bladder and the rigid end structure of the plug is problematic. Customarily, the expandable bladder is formed with an end that is custom formed and wrapped over and around rigid end plates which include anchor means to control the pipe plug, and fittings to provide for supply of air or other gas to the pipe plug during inflation.

In my U.S. Pat. No. 6,481,465, issued on Nov. 19, 2002, entitled, "Compressed-Ring Pneumatic Pipe Plug" incorporated herein by reference, an improved construction of a pipe plug is described. In that reference, the pipe plug has an expandable bladder in the form of an elongated annulus with ends that are connected to disk-like end caps by outer rings that slip over the bladder ends and end caps, and are compressed by swaging. This mechanical means of coupling the elastic bladder to the rigid end caps is both cost efficient and effective.

It is the object of this invention to improve the fabrication process for the pneumatic bladder such that the resulting product is uniform in both appearance and performance and is enhanced with a novel rib and textured band gripping surface. The enhanced gripping surface is formed by a curing mold and improves the resistance to slippage when the pipe plug is installed and expanded. In addition, the mold-formed surface of the pipe plug enhances the ability to inspect the component for quality control of the finished product.

SUMMARY OF THE INVENTION

The pneumatic pipe plug of this invention is fabricated in a mold to provide the outer surface of the pipe plug with a unique ribbed and textured surface to resist slippage when installed and inflated in a pipe. In order to achieve the unique surface configuration, the pipe plug is fabricated using a method that cures the elastic material forming the body of the plug in a heated mold having the desired inside surface that imparts the alternating raised ribs and textured bands to the outside surface of the plug.

A pipe plug is fabricated using layers of uncured elastic strips or sheets typically rubber. The elastic strips or sheets usually contain parallel cords of a synthetic material that add strength, but limit stretch in certain directions. By appropriate layering or wrapping of the rubber strips or sheets on a mandrel, the cylindrical body of the pipe plug can be fabricated with pre-determined expansion characteristics in the finished plug when inflated.

In the pipe plug of this invention, the cylindrical rubber sleeve forming the body of the plug is removed from the mandrel and an inflatable airbag is inserted in the sleeve. With die plugs inserted in the ends of the sleeve, the sleeve and airbag are installed in the mold. The mold with the installed sleeve is mounted into a heated press where the airbag is inflated, forcing the sleeve against the inside surface of the mold and impressing the surface of the sleeve with the characteristic surface of alternating raised ribs and textured bands.

When cured, the airbag is deflated, and the mold is opened, removing the die plugs and pulling out the deflated airbag. The rubber body of the pipe plug is dressed, trimming any flashing, and inspected for defects.

In the preferred embodiment, the end caps are mechanically attached by swaging as described in U.S. Pat. No. 6,481,465. Mechanical attachment is preferred as the use of forming techniques or adhesives may result in failures, the causes of which are difficult to determine, and therefore difficult to prevent. Swaging uses mechanical force to compress a ring or band of metal around then end cuffs of the sleeve and over a complimentary groove in the end caps of the pipe plug.

The finished pipe plug has a predictable performance and has an enhanced gripping surface provided by the alternating raised ribs and textured bands. The pipe plugs can be manufactured in a variety of sizes, from 4 inches to 16 or more inches in diameter for service in a range of pipe sizes up to twice the diameter of a particular plug.

In addition to greater uniformity, the method of fabrication of the pipe plug allows for greater mechanization eliminating may of the irregularities in appearance and performance that result from hand forming. These and other features will become apparent from a consideration of the detailed description of the preferred embodiment.

DETAILED DESCRIPTION OF THE PREFERRED EMBODIMENT

Figure 1:
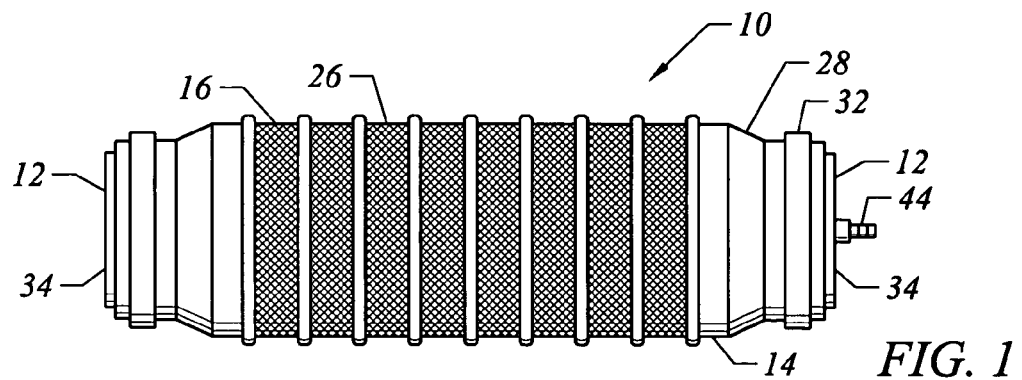
FIG. 1 is a side elevational view of the pipe plug having an outer surface with alternating ribs and textured bands.

The pneumatic pipe plug of this invention is shown in FIG. 1 and is designated generally by the reference numeral 10. The pipe plug 10 is fabricated by a unique method to form the pipe plug with rigid end structures 12 and a cylindrical elastic body 14 having an outside surface 16 with an alternating series of raised ribs 18 and textured bands 20.

Figure 2:
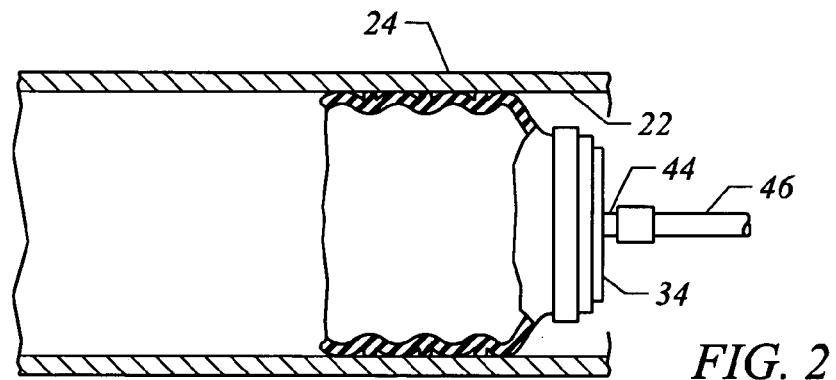
FIG. 2 is a partial cross-sectional view of the pipe plug of FIG. 1 installed in a pipe.
Figure 3:
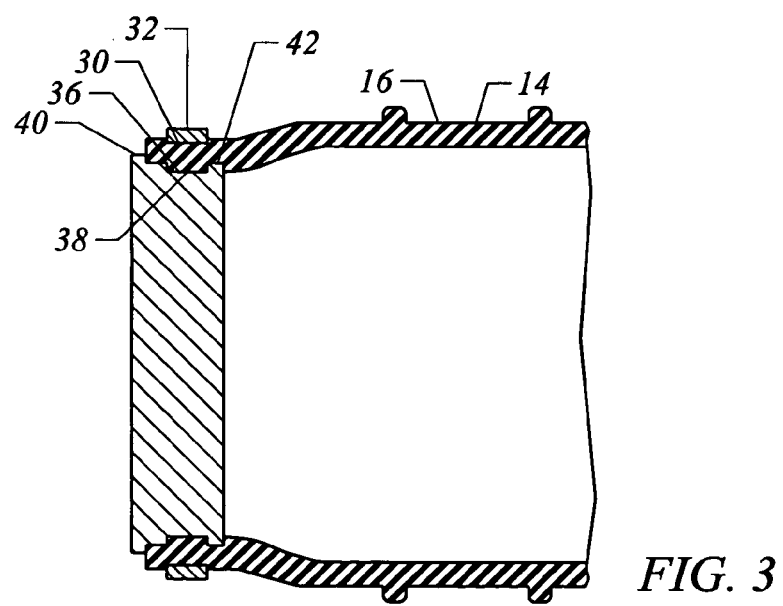
FIG. 3 is an enlarged, cross-sectional view of an end portion of the pipe plug of FIG. 1.

In order to impart the outside surface 16 of the elastic body 14 with the improved gripping surface that engages the inside wall 22 of a typical pipe 24 when the pipe plug 10 is inflated as shown in FIG. 2, a molding process is used as described with reference to FIGS. 5–6. Because the molding process can impart a sharply delineated outside surface 16 to the pipe plug 10, the elastic body 14 can be fabricated with a central sleeve portion 26 and end cuffs 28 having a preformed groove 30 to receive a swaging ring 32 to facilitate the mechanical coupling of rigid end caps 34. The rigid end caps 34 are preferably machined or cast of metal with a complementary groove 36 for seating the swaging ring 32 with a segment 38 of the end cuff 28 sandwiched therebetween, as shown in FIG. 3. Preferably, the end caps 34 and swaging rings 32 are fabricated of aluminum. The rigid end caps 34 have an outer rim 40 that is slightly greater in diameter than the diameter of the portion 42 of the end caps 34 over which the end cuffs 28 are installed to properly position the end caps 34 in the elastic body 14 on assembly before the swaging rings 32 are installed and the swaging operation force compresses the rings 32 and seals the elastic body 14 and end caps 34 mechanically, without the use of adhesives. The mechanical bond avoids the deterioration of adhesives on aging and relies on the inherent elasticity of the material of the expandable body of the plug.

As shown in FIG. 1 at least one end cap 34 includes an air fitting 44, which, as illustrated in FIG. 2, is connectable to an air hose 46 which in turn is connected to a pressurized air source (not shown) for inflating the pipe plug 10 during use. The elastic body 14 of the pipe plug 10 functions as an expandable air bladder that can inflate up to twice its uninflated diameter until restrained by the inside wall 22 of a pipe 24 as illustrated in the example of FIG. 2. The alternating circumferential raised ribs 18 and textured bands 20 cut through any surface coating or surface irregularities on the inside wall of a pipe to enable the pipe plug to frictionaly grip the inside wall and prevent fluid flow.

It is to be understood that while the term "pipe plug" is used, this term includes a "flow through" plug wherein the plug includes a flow through conduit mounted to the end caps for redirecting the fluid flow away from the work area. In addition, because the end caps 34 are structurally sound plates to withstand the swaging process, other fittings may be mounted on the end caps such as eye bolts for setting and retrieving the pipe plug as necessary, pressure sensing components for monitoring the pressure or head of the blocked fluid, and, other accessories as needed for particular operations in the field.

Figure 4:
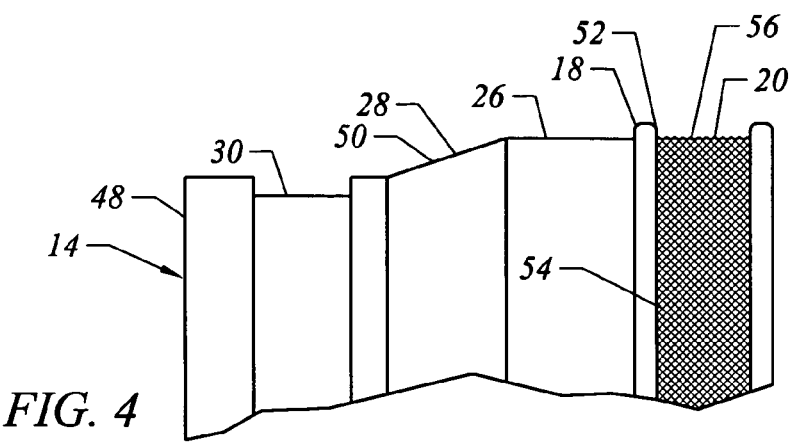
FIG. 4 is an enlarged side view of an end portion of the pipe plug of FIG. 1.

Referring now to the partial enlarged view of the end of the pipe plug body, in FIG. 4, the end cuff 28 of the elastic radially expandable body 14, has an open end 48 into which a substantial portion 42 of the end caps 34 are inserted. The end cuff 28 has the shallow locating groove 30 for the swaging ring 32 adjacent a shoulder portion 50 that provides a transition from the constructed segment 38 under the swaging ring 32 to the central sleeve portion 26 having the molded outside surface 16. The molded outside surface 16 includes the series of alternating raised ribs 18 and textured bands 20. The raised ribs 18 are generally proportional to the diameter of the pipe plug 10, as shown, and are about as wide as high with rounded corners 52. The textured bands 20 are preferably impressed with diagonal cross grooves 54 to produce a "knurled" gripping surface with small "diamond-like" projections 56. In combination, the series of alternating raised ribs 18 and textured bands 20 are superior to either ribs or a textured surface alone in gripping the inside wall of a pipe.

Figure 5:
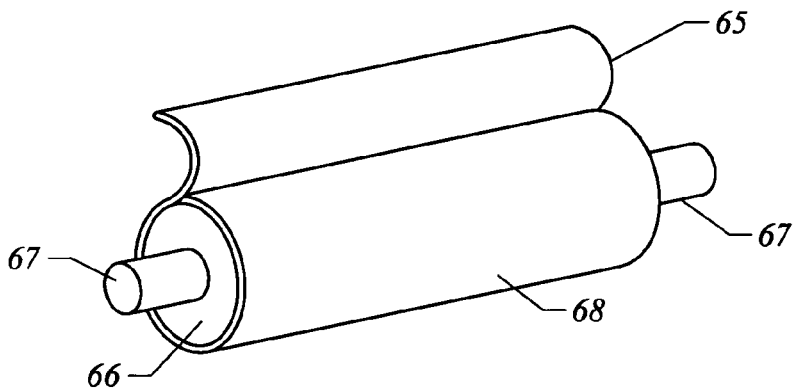
FIG. 5 is a perspective of an uncured rubber sleeve on a forming mandrel.
Figure 6:
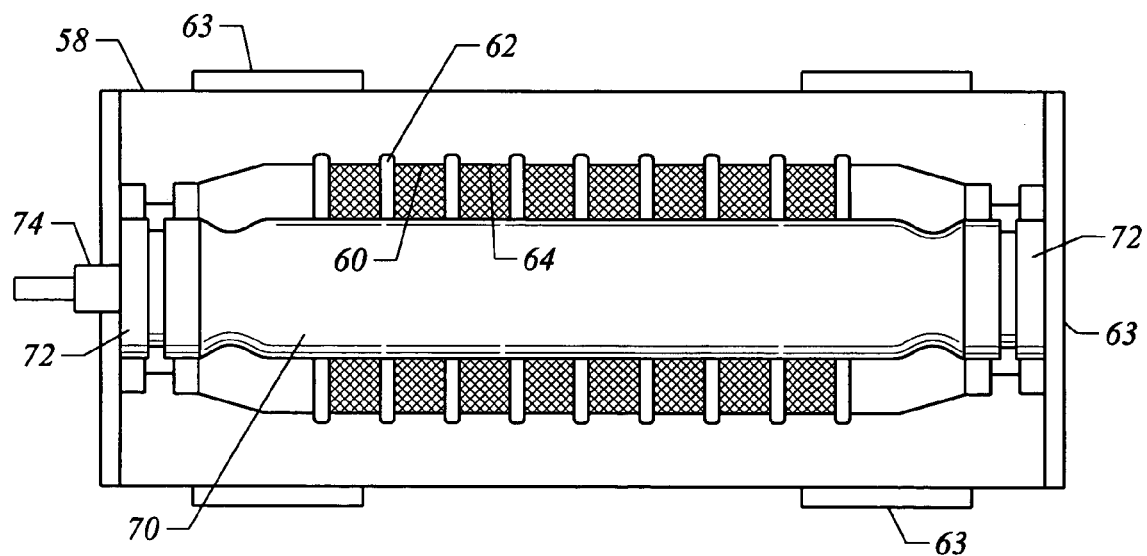
FIG. 6 is a top view of a half section of a mold with an air bag on which the uncured sleeve is to be installed for curing.

Referring to FIGS. 5 and 6, the fabrication of the pipe plug body 14 is accomplished with the use of a metal mold 58. The metal mold 58 is split into two half segments (one half segment shown in FIG. 6) and has an interior surface 60 machined with grooves 62 and textured bands 64 to impart the projecting ribs 18 and textured bands 20 to the outside surface 16 of the body 14 of the plug 10. The mold 58 has projecting alignment plates 63 to align the top segment (not shown) with the segment shown.

The elastic plug body 14 is preferably formed by strips or sheets 65 of uncured rubber being machine wrapped or rolled up by hand on a mandrel 66 as shown in FIG. 5. The mandrel 66 is sized for the particular mold being used and has journal axles 67 for facilitating machine for hand rolling. The formed sleeve 68 is removed from the mandrel 66 and an inflatable airbag 70 with connected end plugs 72 is inserted into the hollow cylindrical sleeve 68.

The interior surface of the mold 58 is coated with a silicone spray and the uncured sleeve 68 that forms the pipe plug body 14 is placed in the mold 58 with the pre-installed inflatable air bag and connected end plugs to a thin closed mold 58 into a thermal press (not shown) and the air bag 70 is inflated through a fitting 74 in one of the end plugs 72 to force the uncured sleeve 68 against the interior surface 60 of the mold 58, while the thermal press heats the mold to about 275° F. to cure the imprinted rubber sleeve to form the finished pipe plug body 14.

When the mold 58 is cooled or partially cooled, the airbag is deflated, the mold is opened and the pipe plug body 14 is removed. The deflated airbag 70 and attached end plugs 72 are pulled out of the pipe plug body 14. The pipe plug body 14 is inspected with any flashing of the rubber trimmed. The end caps 34 are inserted into each end of the plug body 14 and the swaging rings 32 are positioned over the pre-formed groove 30. The plug body is mechanically sealed into the end caps by a swaging process by compression of the swaging rings 32 over the cuffs of the plug body 14.

Preferably the finished product is inspected and tested before shipment.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A pipe plug having a mold-formed plug body comprising:

a cylindrical radially expandable plug body having end portions and a central portion with an outer surface having a series of alternating circumferential raised ribs and circumferential textured bands;

first and second rigid end caps wherein the end caps have a portion inserted into the end portions of the plug body; and, first and second swaging rings installed over the end portions of the plug body and the portions of the end caps inserted into the end portions of the plug body, the swaging rings being swaged into the end portions to compress the end portions of the plug body onto the end caps, wherein at least one end cap has an air fitting for inflating the pipe plug and expanding the plug body and wherein the series of alternating circumferential raised ribs and textured bands form a gripping surface that improves the resistance to slippage when the pipe plug is installed in a pipe and inflated wherein the textured bands are formed with diagonal cross grooves to produce a knurled gripping surface.

2. The pipe plug of claim 1 wherein the raised ribs have a width and a height with the width substantially equal to the height.

3. The pipe plug of claim 1 wherein the end portions each have an outer surface circumferential groove for seating the swaging ring.

4. A pipe plug having a mold-formed plug body comprising:

a cylindrical radially expandable plug body having end portions and a central portion with an outer surface having a series of alternating circumferential raised ribs and circumferential textured bands wherein the textured bands are formed with a knurled surface;

first and second rigid end caps coupled to respective first and second end portions of the plug body, wherein at least one end cap has an air fitting for inflating the pipe plug and expanding the plug body and wherein the series of alternating circumferential raised ribs and textured bands form a gripping surface that improves the resistance to slippage when the pipe plug is installed in a pipe and expanded.

5. The pipe plug of claim 4, wherein the raised ribs have a width and a height with the width substantially equal to the height.

6. The pipe plug of claim 4 further comprising a coupling ring, wherein the end portions of the plug body each have an outer circumferential groove and the coupling ring at least in part engages the groove when the end caps are inserted into the end portions of the plug body and the coupling rings are installed onto the end portions over the end caps in engagement with the outer grooves.

* * * * *